United States Patent
Song

(10) Patent No.: US 12,078,889 B2
(45) Date of Patent: Sep. 3, 2024

(54) BACKLIGHT MODULE, DISPLAY PANEL, AND DISPLAY DEVICE

(71) Applicant: TCL CHINA STAR OPTOELECTRONICS TECHNOLOGY CO., LTD., Guangdong (CN)

(72) Inventor: Zihang Song, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 474 days.

(21) Appl. No.: 17/413,276

(22) PCT Filed: Dec. 30, 2020

(86) PCT No.: PCT/CN2020/141170
§ 371 (c)(1),
(2) Date: Jun. 11, 2021

(87) PCT Pub. No.: WO2021/203754
PCT Pub. Date: Oct. 14, 2021

(65) Prior Publication Data
US 2023/0359084 A1    Nov. 9, 2023

(30) Foreign Application Priority Data
Apr. 9, 2020    (CN) .......................... 202010272840.9

(51) Int. Cl.
G02F 1/1335    (2006.01)
G02F 1/13357   (2006.01)

(52) U.S. Cl.
CPC .. *G02F 1/133614* (2021.01); *G02F 1/133603* (2013.01); *G02F 1/133605* (2013.01); *G02F 1/133606* (2013.01); *G02F 1/133611* (2013.01)

(58) Field of Classification Search
CPC ......... H01L 33/504; H01L 2224/48091; H01L 2224/45144; H01L 2924/181; H01L 33/507; H01L 33/52; H01L 33/56; H01L 2224/48247; H01L 2924/12041; H01L 2924/12042; H01L 2924/3025;
(Continued)

(56) References Cited

U.S. PATENT DOCUMENTS

2019/0004231 A1    1/2019  Chang et al.
2019/0363224 A1*  11/2019  Baretz .................... H01L 33/56

FOREIGN PATENT DOCUMENTS

CN    101226869 A    7/2008
CN    103343943 A    10/2013
(Continued)

OTHER PUBLICATIONS

Search English translation of WO 2012132232 A1 (Year: 2012).*
(Continued)

*Primary Examiner* — Omar Rojas Cadima

(57) ABSTRACT

A backlight module, a display panel, and a display device are disclosed. The backlight module includes a light-emitting diode (LED) light source and a quantum-dot-brightness enhancement film disposed on one side of the LED light source, wherein the quantum-dot-brightness enhancement film contains a resin system of blue phosphor and red-and-green quantum dots.

14 Claims, 1 Drawing Sheet

(58) Field of Classification Search
CPC .................. H01L 33/483; H01L 33/50; H01L 2224/45015; H01L 2224/45124; H01L 2224/48257; H01L 2224/73265; H01L 2224/8592; H01L 24/45; H01L 24/97; H01L 27/156; H01L 2924/12044; H01L 2924/16195; H01L 2933/0041; H01L 33/04; H01L 33/06; H01L 33/48; H01L 33/501; H01L 33/502; H01L 33/505; H01L 33/508; H01L 33/60; H01L 33/62; H01L 33/641; H01L 33/644; C09K 11/0883; C09K 11/616; C09K 11/675; C09K 11/7734; C09K 11/77342; C09K 11/77347; C09K 11/77348; C09K 11/7739; G02F 1/133605; G02F 1/133606; G02F 1/133611; G02F 1/133614; G02F 1/133603
See application file for complete search history.

(56) References Cited

FOREIGN PATENT DOCUMENTS

| CN | 203587926 U | 5/2014 | |
|---|---|---|---|
| CN | 104465911 A | * 3/2015 | ....... G02F 1/133603 |
| CN | 206057759 U | 3/2017 | |
| CN | 107250659 A | 10/2017 | |
| CN | 107425106 A | 12/2017 | |
| CN | 111323969 A | 6/2020 | |
| JP | 2017120319 A | 7/2017 | |
| WO | WO-2012132232 A1 | * 10/2012 | ........... H01L 33/505 |

OTHER PUBLICATIONS

Search English translation of CN 104465911 A (Year: 2015).*
International Search Report in International application No. PCT/CN2020/141170, mailed on Mar. 31, 2021.
Written Opinion of the International Search Authority in International application No. PCT/CN2020/141170, mailed on Mar. 31, 2021.
Chinese Office Action issued in corresponding Chinese Patent Application No. 202010272840.9 dated Jan. 4, 2021, pp. 1-8.
Chinese Office Action issued in corresponding Chinese Patent Application No. 202010272840.9 dated Aug. 13, 2021, pp. 1-6.

* cited by examiner

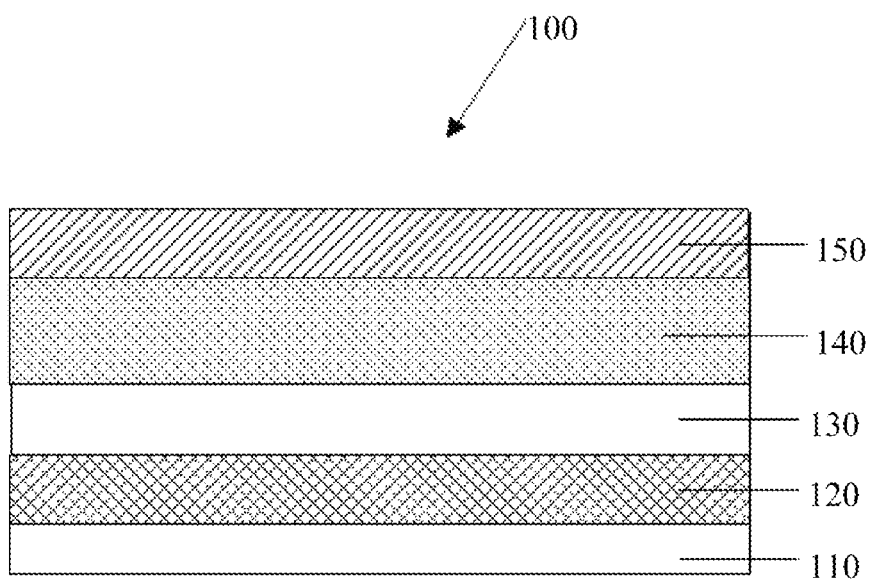

BACKLIGHT MODULE, DISPLAY PANEL, AND DISPLAY DEVICE

FIELD OF INVENTION

The present disclosure relates to the technical field of display panels, and specifically to a backlight module, a display panel, and a display device.

BACKGROUND OF INVENTION

Currently, liquid crystal display (LCD) is the most common display in the display field. Consumers love the LCD due to its own thinness, low energy consumption, and low price. However, a combination of traditional white backlight and color resistance makes the color gamut of the LCD continue in a bad situation. Quantum dot material is one of the most concerned luminescent materials in recent years and has advantages such as concentrated luminescence peaks, high color purity, and the luminous band position that can be changed by adjusting the composition and size of quantum dots. Currently, many products have applied quantum dots in LCDs to enhance the color gamut of the display.

Generally, a quantum-dot-brightness enhancement film is made by extruding a resin system of quantum dots, and the quantum-dot-brightness enhancement film is placed in a backlight unit of the LCD. Since synthesis technology of red-and-green quantum dots in quantum dot material field is mature and has high fluorescence quantum yield. Taking cadmium selenide (CdSe) quantum dot as an example, its fluorescence quantum yield can reach more than 90%. However, blue quantum dots are difficult to use in products due to their small size, poor stability, and low fluorescence quantum yield. Therefore, products generally use a blue backlight as a backlight source to stimulate the quantum-dot-brightness enhancement film mixed with red-and-green quantum dots to obtain white light. Because the luminescence peaks of blue light-emitting diode (LED) are also concentrated, applications of blue quantum dots become less critical.

However, because the quantum dots are point light sources similar to light-emitting spheres, a light pattern of red stimulated by the red quantum dot and a light pattern of green are larger, while a light pattern of blue LED is small because it is limited by the LED's own design. Because red, green, and blue light patterns are quite different before white light mixed with the red, green, and blue light enters an LCD panel; as a viewing angle becomes larger, the red light and green light decay slowly, while the blue light decays fastly due to the influence of the light patterns, resulting in a problem of a large yellowish viewing angle.

Therefore, it is indeed necessary to develop a new type of backlight module to overcome the shortcomings of the prior art.

SUMMARY OF INVENTION

An object of the present disclosure is to provide a backlight module, which can solve a problem of a large difference between red, green, and blue light patterns in a quantum dot liquid crystal display panel in the prior art, when a viewing angle becomes larger, affected by the light patterns, the red and green light decays slowly, while the blue light decays fastly, thereby causing a large yellowish viewing angle.

To achieve the above object, the present disclosure provides a backlight module, including a light-emitting diode (LED) light source; and a quantum-dot-brightness enhancement film disposed on one side of the LED light source; wherein the quantum-dot-brightness enhancement film contains a resin system of blue phosphor and red-and-green quantum dots.

Further, in other embodiments, the LED light source is an ultraviolet LED light source or a near-ultraviolet LED light source.

The blue phosphor and the red-and-green quantum dots are mixed to prepare a new quantum dot resin system, and then the quantum-dot-brightness enhancement film is prepared by extrusion molding. The backlight is stimulated by ultraviolet or near-ultraviolet LED to stimulate the blue phosphor and red-and-green quantum dots jointly emit red, green, and blue light that has the same light pattern, to solve a problem of a difference between the red, green, and blue light patterns, thereby improving a case of a large viewing angle with color deviation.

Further, in other embodiments, the blue phosphor is selected from one or more combinations of $BaMgAl14O23:Eu$, $BaMg2Al16O27:Eu$, and $Al7O3N5:Eu$.

Further, in other embodiments, the red-and-green quantum dots are selected from one or more combinations of CdSe, $ZnCdSe2$, InP, $Cd2Sse$, $Cd2SeTe$, and InAs.

The blue phosphor can act as diffusion particles to increase the ultraviolet optical path and prevent the agglomeration of the quantum dots, which can improve utilization rate of ultraviolet light, thereby improving light efficiency of the quantum dots in the quantum-dot-brightness enhancement film. Further, the blue light emitted by the blue phosphor can also stimulate the red-and-green quantum dots, which can further enhance the light efficiency of the quantum dots.

Further, in other embodiments, the backlight module further includes a reflective sheet disposed on one side of the LED light source away from the quantum-dot-brightness enhancement film.

Further, in other embodiments, the backlight module further includes a diffusion plate disposed between the LED light source and the quantum-dot-brightness enhancement film.

Further, in other embodiments, the backlight module further includes a long-wave transmission film disposed on one side of the quantum-dot-brightness enhancement film away from the LED light source.

The long-wave transmission film is used to filter out the ultraviolet light harmful to the human body and prevents the ultraviolet light from passing through the display panel.

Further, in other embodiments, the long-wave transmission film is configured to pass light with a wavelength between 420 and 1000.

To achieve the above object, the present disclosure discloses a display panel including the backlight module of the present disclosure.

To achieve the above object, the present disclosure discloses a display device including the display panel of the present disclosure.

Compared with the prior art, beneficial effects of the present disclosure are that, the present disclosure provides a backlight module, a display panel, and a display device. A new type of quantum dot resin system is prepared by mixing the blue phosphor with red-and-green quantum dots to prepare the quantum-dot-brightness enhancement film by extrusion molding. The backlight is stimulated by ultraviolet or near-ultraviolet LED to stimulate the blue phosphor and red-and-green quantum dots jointly emit red, green, and blue light that has the same light pattern, to solve a problem of a difference between the red, green, and blue light patterns, thereby improving a case of a large viewing angle with color deviation. At the same time, the blue phosphor can act as diffusion particles to increase the ultraviolet optical path and prevent the agglomeration of the quantum dots, which can improve utilization rate of ultraviolet light, thereby improving the light efficiency of the quantum dots in the quantum-dot-brightness enhancement film. Further, the blue light emitted by the blue phosphor can also stimulate the red-and-green quantum dots, which can further enhance the light efficiency of the quantum dots. Finally, the long-wave transmission film is used to filter out the ultraviolet light harmful to the human body and prevents the ultraviolet light from passing through the display panel.

BRIEF DESCRIPTION OF DRAWINGS

The technical solutions and other beneficial effects of the present disclosure will be made obvious by describing the specific implementation manners of the present disclosure in detail below in conjunction with the accompanying drawings.

FIG. 1 is a schematic structural diagram of a backlight module provided by an embodiment of the present disclosure.

DESCRIPTION OF THE DRAWINGS

Backlight module: 100;
Reflective sheet: 110; light emitting diode (LED): 120;
Diffusion plate: 130;
Quantum-dot-brightness enhancement film: 140; and long-wave passing film: 150.

DETAILED DESCRIPTION OF PREFERRED EMBODIMENTS

The technical solutions in the embodiments of the present disclosure will be clearly and completely described below in conjunction with the drawings in the embodiments of the present disclosure. Obviously, the described embodiments are only a part of the embodiments of the present disclosure, rather than all the embodiments. Based on the embodiments in the present disclosure, all other embodiments obtained by those skilled in the art without creative work shall fall within the protection scope of the present disclosure.

In the description of the present disclosure, it should be understood that the terms "center," "longitudinal," "transverse," "length," "width," "thickness," "upper," "lower," "front," "back," "left," "right," "vertical," "horizontal," "top," "bottom," "inner," "outer," "clockwise," "counterclockwise" and other directions or a positional relationship is based on a directional or positional relationship shown in the drawings. It is only for the convenience of describing the present disclosure and simplifying the description and does not indicate or imply that devices or elements must have a specific orientation or must be constructed and operated in a specific orientation. Therefore, it cannot be understood as a limit to the present disclosure. In addition, the terms "first" and "second" are only used for descriptive purposes and cannot be understood as indicating or implying relative importance or implicitly indicating the number of indicated technical features. Therefore, the features defined with "first" and "second" may explicitly or implicitly include one or more of the features. In the description of the present disclosure, "plural" means two or more than two, unless otherwise specifically defined.

In the description of the present disclosure, it should be noted that, unless otherwise clearly specified and limited, the terms "installation," "interconnection," and "connection" should be understood in a broad sense. For example, it can be a fixed connection or a detachable connection, or an integral connection. It can be mechanically connected, or electrically connected, or can communicate with each other. It can be directly connected or indirectly connected through an intermediate medium, or it can be the internal communication of two components or an interactive relationship of two components. For those ordinarily skilled in the art, the specific meanings of the above-mentioned terms in the present disclosure can be understood according to specific circumstances.

Generally, a quantum-dot-brightness enhancement film is made by extruding a resin system of quantum dots, and the quantum-dot-brightness enhancement film is placed in a backlight unit of the LCD. Since synthesis of red-and-green quantum dots in quantum dot materials is mature and has high fluorescence quantum yield. Taking cadmium selenide (CdSe) quantum dots as an example, the fluorescence quantum yield can reach more than 90%. However, blue quantum dots are difficult to use in products due to their small size, poor stability, and low fluorescence quantum yield. Therefore, general products use a blue backlight as a backlight source to the quantum-dot-brightness enhancement film mixed with red-and-green quantum dots to obtain white light. Because the luminescence peaks of blue LEDs are also concentrated, applications of blue quantum dots become less critical.

However, because the quantum dots are point light sources similar to light-emitting spheres, a light pattern of red stimulated by the red quantum dot and a light pattern of green are larger, while a light pattern of blue LED is small because it is limited by the LED's own design. Because red, green, and blue light patterns are quite different before white light mixed with the red, green, and blue light enters an LCD panel; as a viewing angle becomes larger, the red light and green light decay slowly, while the blue light decays fastly due to the influence of the light patterns, resulting in a problem of a large yellowish viewing angle.

An embodiment of the present disclosure provides a backlight module, which can solve a problem of a large difference between red, green, and blue light patterns in a quantum dot liquid crystal display panel in the prior art, when a viewing angle becomes larger, affected by the light patterns, the red and green light decays slowly, while the blue light decays fastly, thereby causing a large yellowish viewing angle.

Specifically, please refer to FIG. 1. FIG. 1 is a schematic structural diagram of a backlight module 100 provided by the present embodiment. The backlight module 100 includes a reflective sheet 110, a light-emitting diode (LED) light source 120, a diffusion plate 130, a quantum-dot-brightness enhancement film 140, and a long-wave transmission film 150.

The reflective sheet 110 is disposed on one side of the LED light source 120 to reflect light from the LED light source 120 and improve light utilization rate of the LED light source 120.

In the present embodiment, the LED light source 120 is an ultraviolet LED light source or a near-ultraviolet LED light source.

The diffusion plate 130 is disposed on one side of the LED light source 120 away from the reflective sheet 110 and is used to diffuse the light from the LED light source 120 to improve the light utilization rate of the LED light source 120.

The quantum-dot-brightness enhancement film 140 is disposed on one side of the diffusion plate 130 away from the LED light source 120, wherein the quantum-dot-brightness enhancement film 140 contains blue phosphor and a resin system of red-and-green quantum dots.

A new type of quantum dot resin system is prepared by mixing the blue phosphor with red-and-green quantum dots to prepare the quantum-dot-brightness enhancement film by extrusion molding. The backlight is stimulated by ultraviolet or near-ultraviolet LED to stimulate the blue phosphor and red-and-green quantum dots jointly emit red, green, and blue light that has the same light pattern, to solve a problem of a difference between the red, green, and blue light patterns, thereby improving a case of a large viewing angle with color deviation.

The blue phosphor is selected from one or more combinations of $BaMgAl_{14}O_{23}:Eu$, $BaMg_2Al_{16}O_{27}:Eu$, and $Al_7O_3N_5:Eu$.

The red-and-green quantum dots are selected from one or more combinations of CdSe, $ZnCdSe_2$, InP, $Cd_2Sse$, $Cd_2SeTe$, and InAs.

In addition, the blue phosphor can act as diffusion particles to increase the ultraviolet optical path and prevent the agglomeration of the quantum dots, which can improve the utilization rate of ultraviolet light, thereby improving the light efficiency of the quantum dots in the quantum-dot-brightness enhancement film. Further, the blue light emitted by the blue phosphor can also stimulate the red-and-green quantum dots, which can further enhance the light efficiency of the quantum dots.

The long-wave transmission film 150 is disposed on one side of the quantum-dot-brightness enhancement film 140 away from the LED light source 120. The long-wave transmission film 150 can filter out the ultraviolet light harmful to the human body and prevents the ultraviolet light from passing through the display panel.

The long-wave transmission film 150 is configured to pass light with a wavelength between 420-1000.

An embodiment of the present disclosure also provides a display panel, which includes the backlight module 100, an array substrate, and a color filter substrate related to the present disclosure.

Specifically, the array substrate includes a substrate layer, a buffer layer disposed on the substrate layer, an active layer disposed on the buffer layer, a gate insulation layer disposed on the active layer, and a gate layer disposed on the gate insulation layer, an interlayered dielectric layer disposed on the gate layer, a source-and-drain layer disposed on the interlayered dielectric layer, and a planarization layer disposed on the source-and-drain layer, a pixel electrode layer disposed on the planarization layer, and a pixel definition layer disposed on the pixel electrode layer. Improvement of the present disclosure lies in the backlight module 100, and there is thus no need for providing the same description to the array substrate and the color filter substrate again.

In the backlight module 100, the blue phosphor and the red-and-green quantum dots are mixed to prepare the new quantum dot resin system, and then the quantum-dot-brightness enhancement film 140 is prepared by extrusion molding. The backlight is stimulated by ultraviolet or near-ultraviolet LED to stimulate the blue phosphor and red-and-green quantum dots jointly emit red, green, and blue light that has the same light pattern, to solve a problem of a difference between the red, green, and blue light patterns, thereby improving a case of a large viewing angle with color deviation.

The embodiment of the present disclosure also provides a display device that includes the display panel related to the present disclosure.

Beneficial effects of the present disclosure are that, the present disclosure provides a backlight module, a display panel, and a display device. The new type of quantum dot resin system is prepared by mixing the blue phosphor with red-and-green quantum dots to prepare the quantum-dot-brightness enhancement film 140 by extrusion molding. The backlight is stimulated by ultraviolet or near-ultraviolet LED to stimulate the blue phosphor and red-and-green quantum dots jointly emit red, green, and blue light that has the same light pattern, to solve a problem of a difference between the red, green, and blue light patterns, thereby improving a case of a large viewing angle with color deviation. At the same time, the blue phosphor can act as diffusion particles to increase the ultraviolet optical path and prevent the agglomeration of the quantum dots, which can improve utilization rate of ultraviolet light, thereby improving the light efficiency of the quantum dots in the quantum-dot-brightness enhancement film 140. Further, the blue light emitted by the blue phosphor can also stimulate the red-and-green quantum dots, which can further enhance the light efficiency of the quantum dots. Finally, the long-wave transmission film 150 is used to filter out the ultraviolet light harmful to the human body and prevents the ultraviolet light from passing through the display panel.

In the above-mentioned embodiments, the description of each embodiment has its own emphasis. For parts that are not described in detail in one of the embodiments, the references may be made to related descriptions of other embodiments.

The backlight module, display panel, and display device provided by the embodiments of the present disclosure are described in detail above. Specific examples are used in this article to illustrate the principles and implementations of the present disclosure. The description of the above embodiments is only to help understand the technical solutions and core ideas of the present disclosure. Those ordinarily skilled in the art should understand that they can still modify the technical solutions described in the foregoing embodiments or equivalently replace some technical features. These modifications or replacements do not make the essence of the corresponding technical solutions deviate from the scope of the technical solutions of the embodiments of the present disclosure.

What is claimed is:
1. A backlight module, comprising:
a light-emitting diode (LED) light source; and
a quantum-dot-brightness enhancement film disposed on one side of the LED light source;
wherein the quantum-dot-brightness enhancement film contains a resin system of blue phosphor and red-and-green quantum dots, the blue phosphor is used as diffusion particles to prevent agglomeration of red-and-green quantum dots, and a part of blue light emitted by the blue phosphor stimulates the red-and-green quantum dots, the blue phosphor is selected from one of $BaMgAl_{14}O_{23}:Eu$, $BaMg_2Al_{16}O_{27}:Eu$, and $Al_7O_3N_5:Eu$, or any combination thereof, and the red-and-green quantum dots are selected from one of $ZnCdSe_2$, $Cd_2Sse$, and $Cd_2SeTe$, or any combination thereof.

2. The backlight module as claimed in claim 1, wherein the LED light source is an ultraviolet LED light source or a near-ultraviolet LED light source.

3. The backlight module as claimed in claim 1, further comprising:
a reflective sheet disposed on one side of the LED light source away from the quantum-dot-brightness enhancement film.

4. The backlight module as claimed in claim 1, further comprising:
a diffusion plate disposed between the LED light source and the quantum-dot-brightness enhancement film.

5. The backlight module as claimed in claim 1, further comprising:
a long-wave transmission film disposed on one side of the quantum-dot-brightness enhancement film away from the LED light source.

6. The backlight module as claimed in claim 5, wherein the long-wave transmission film is configured to pass light with a wavelength between 420 and 1000.

7. A display panel, comprising a backlight module, wherein the backlight module comprises:
a light-emitting diode (LED) light source; and
a quantum-dot-brightness enhancement film disposed on one side of the LED light source;
wherein the quantum-dot-brightness enhancement film contains a resin system of blue phosphor and red-and-green quantum dots, the blue phosphor is used as diffusion particles to prevent agglomeration of red-and-green quantum dots, and a part of blue light emitted by the blue phosphor stimulates the red-and-green quantum dots, the blue phosphor is selected from one of $BaMGAl14O23:EU$, $BaMg2Al16O27$: Eu, and $Al7O3N5$: Eu, or any combination thereof, and the red-and-green quantum dots are selected from one of $ZnCdSe2$, $Cd2Sse$, and $Cd2SeTe$, or any combination thereof.

8. The display panel as claimed in claim 7, wherein the LED light source is an ultraviolet LED light source or a near-ultraviolet LED light source.

9. The display panel as claimed in claim 7, further comprising:
a reflective sheet disposed on one side of the LED light source away from the quantum-dot-brightness enhancement film.

10. The display panel as claimed in claim 7, further comprising:
a diffusion plate disposed between the LED light source and the quantum-dot-brightness enhancement film.

11. The display panel as claimed in claim 7, further comprising:
a long-wave transmission film disposed on one side of the quantum-dot-brightness enhancement film away from the LED light source.

12. The display panel as claimed in claim 11, wherein the long-wave transmission film is configured to pass light with a wavelength between 420 and 1000.

13. A display device, comprising a display panel comprising a backlight module, wherein the backlight module comprises:
a light-emitting diode (LED) light source; and
a quantum-dot-brightness enhancement film disposed on one side of the LED light source;
wherein the quantum-dot-brightness enhancement film contains a resin system of blue phosphor and red-and-green quantum dots, the blue phosphor is used as diffusion particles to prevent agglomeration of red-and-green quantum dots, and a part of blue light emitted by the blue phosphor stimulates the red-and-green quantum dots, the blue phosphor is selected from one of $BaMgAl14O23$: Eu, $BaMg2Al16O27$: Eu, and $Al7O3N5$: Eu, or any combination thereof, and the red-and-green quantum dots are selected from one of $ZnCdSe2$, $Cd2Sse$, and $CD2SeTe$, or any combination thereof.

14. The display device as claimed in claim 13, wherein the LED light source is an ultraviolet LED light source or a near-ultraviolet LED light source.

* * * * *